United States Patent [19]
Jenner et al.

[11] 3,820,340

[45] June 28, 1974

[54] CORRUGATED PLASTIC PIPE AND DRAINAGE SYSTEM USING THE SAME

[75] Inventors: Heinrich Jenner, Hassfurth; Georg Schmidt, Konigsberg, both of Germany

[73] Assignee: Franische Isolierrohr-Und Metallwaren-Werk Gebrueder Kirchner, Konigsberg, Bayern, Germany

[22] Filed: July 18, 1972

[21] Appl. No.: 273,559

[30] Foreign Application Priority Data
July 20, 1971  Germany............................ 7127845

[52] U.S. Cl..................................... 61/11, 138/178
[51] Int. Cl............................................ E02b 11/00
[58] Field of Search ..................... 61/10, 11, 12, 13; 138/178

[56] References Cited
UNITED STATES PATENTS

| | | | |
|---|---|---|---|
| 319,721 | 6/1885 | Hudson............................ | 138/173 |
| 1,105,539 | 7/1914 | Smith................................ | 61/10 |
| 2,810,264 | 10/1957 | Kelly................................. | 61/11 |
| 3,309,875 | 3/1967 | Niederwemmer.................. | 61/13 |
| 3,440,822 | 4/1969 | Megler.............................. | 61/10 |
| 3,461,531 | 8/1969 | De Gain............................ | 61/11 |

Primary Examiner—Robert R. Mackey
Assistant Examiner—Alex Grosz
Attorney, Agent, or Firm—Michael S. Striker

[57] ABSTRACT

A corrugated synthetic plastic pipe is provided with alternate circumferential ridges and hollows. In the hollows the wall of the pipe is formed with apertures and some or all of the ridges are formed in their exterior side with a respective radially inwardly divergent depression, all such depressions being aligned in axial direction of the pipe. A system utilizing such a pipe is provided with a foil of synthetic plastic material on the upper side of which the pipe is deposited, whereas at the lower side of the foil there is provided a strand of material which is pushed with a surrounding portion of the foil into the respective depressions to be retained by snap action therein.

11 Claims, 3 Drawing Figures

PATENTED JUN 28 1974 3,820,340

CORRUGATED PLASTIC PIPE AND DRAINAGE SYSTEM USING THE SAME

BACKGROUND OF THE INVENTION

The present invention relates to a novel pipe of synthetic plastic material, and to a drainage system utilizing this pipe.

It is already known to construct drainage systems, particularly for draining road beds, the beds of super highways and the like, in which special provision is made to prevent the entry of water into the road bed as much as possible. For this purpose, there is placed onto the surface from which water is to be carried away, and into which the penetration of water is to be prevented, a foil of synthetic plastic material which is water impermeable. On this foil there are deposited one or more pipes provided with a plurality of apertures so that water which penetrates to the foil — and which is prevented from penetrating beyond the same — will be able to enter into the interior of the pipe through these apertures, whereupon it is carried away by the pipe. The pipes used for this purpose in the prior art are smooth-walled pipes having a relatively substantial wall thickness. They are not flexible, due to their substantial wall thickness and can therefore be installed only in fixed lengths. The outer surface of these pipes is provided with an axially extending undercut groove, that is a groove whose cross section diverges from a narrower dimension at the outer surface of the pipe to a wider dimension inwardly of this outer surface. To connect the pipe with the foil, the pipe is placed onto the foil or the latter is placed onto the pipe, covering the groove. Thereupon a rope, rod or the like is placed against the foil at the side thereof facing away from the pipe and is pressed (together with surrounding portions of the foil) into the undercut groove. This results in a temporary elastic deformation of the material of the pipe bounding the groove by the rope or the like and the foil portions surrounding it snap into the groove where they are retained. Thus, the connection between the pipe and the foil can be terminated only by exertion of a certain amount of force, namely force sufficient to again elastically deform the material of the pipe to permit the rope or the like to slip out of the groove.

This construction assures that the pipe or pipes will always be located at the desired positions, that is at those positions where — as has been previously determined — water is to be intercepted and carried off.

The trouble with the prior-art teaching is that the pipes which have heretofore been used are rigid so that they can be supplied and installed only in fixed lengths, not in form of coils. Furthermore, the installation of a rigid pipe is frequently more difficult than that of the flexible pipe, particularly if it is desired to have the pipe conform to a particular contour or the like. Another drawback is the fact that these pipes are relatively expensive, being thick-walled and requiring a quite substantial amount of material which is, of course, reflected in their price.

SUMMARY OF THE INVENTION

Accordingly, it is an object of the present invention to overcome the disadvantages of the prior art.

More particularly it is an object of the present invention to provide a pipe which can be utilized in the manner outlined above, but which avoids the disadvantages of the prior art.

Another object of the invention is to provide an improved drainage system utilizing such a novel pipe.

It is already known to provide corrugated pipes of synthetic plastic material, that is pipes which in longitudinal direction are provided alternately with circumferentially extending hollows and circumferentially extending ridges. Such pipes are frequently used as drainage pipes and for other purposes. Due to their corrugation they are readily bendable and can therefore be accommodated to almost any desired configuration or contour. This also makes possible their utilization in lengths of almost any desired size, because they can be supplied in coils. In addition, pipes of this type require the minimum possible amount of material expenditure and yet offer a high resistance to being collapsed or flattened under external pressure.

The difficulty heretofore has been that such pipes could not be provided with the longitudinally extending undercut groove into which the connecting element for connection of the pipe with the plastic foil, could be snapped.

The present invention avoids the disadvantages of the prior art, and makes possible the utilization of a corrugated pipe of synthetic plastic material.

In pursuance of the objects outlined above, one feature of the invention resides in a novel article of manufacture, namely a pipe of synthetic plastic material having a corrugated wall provided in axial direction with alternate circumferential ridges and hollows. This wall is provided in respective ones of the hollows with plurality of apertures. At least some of the ridges of the wall are each formed in the exterior side with a radially inwardly divergent depression, and all depressions are aligned in axial direction of the pipe.

The reason why heretofore the utilization of such pipes in the drainage systems of the type here under discussion was not feasible is simply because the wall thickness of such pipes is very small, especially as compared to the type of pipe which was previously used in these drainage systems. The dimensions of a groove of undercut configurations, as required for connecting the foil with the pipes, are such that they substantially exceed the wall thickness of corrugated pipes and could therefore not be provided in such pipes.

A further problem encountered with corrugated pipes, and heretofore preventing the use of such pipes in the context here under discussion, was that the corrugation is produced in the pipe only after the smooth plastic pipe is pressed in plastically deformable condition against appropriate shaping elements which advance with the advancing plastic pipe, and which form the corrugations in the pipe while at the same time the interior of the pipe is subjected to requisite elevated pressure. It was heretofore thought impossible to produce an undercut groove in the exterior side of such a pipe, simply because the tool or tools required for the formation of such a groove seemed incapable of being withdrawn from the groove due to the undercut configuration of the latter subsequent to its formation. Evidently, this problem did not exist in the smooth-walled tubes according to the prior art, because such tubes can be extruded or otherwise formed with the undercut grooves at the time of their production.

The novel features which are considered as characteristic for the invention are set forth in particular in the appended claims. The invention itself, however, both as to its construction and its method of operation,

DESCRIPTION OF THE PREFERRED EMBODIMENTS

Figure 1:
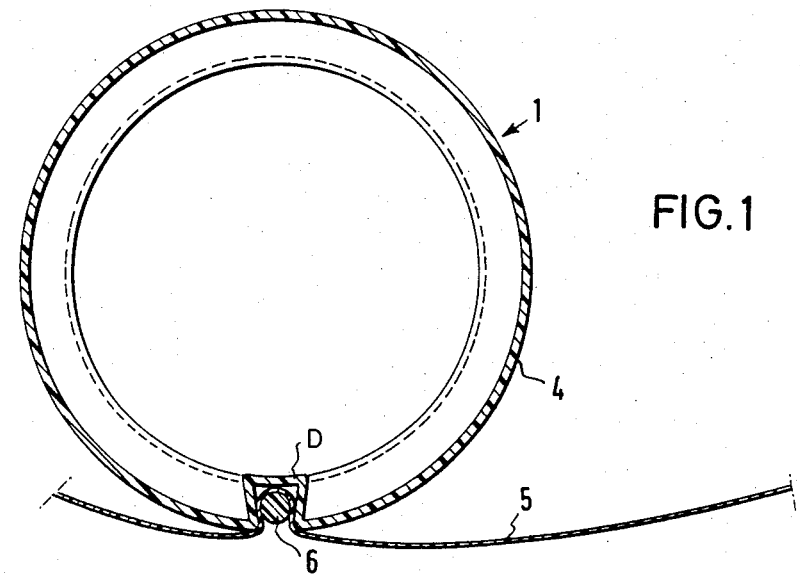
FIG. 1 is a section taken on line I—I of FIG. 2, that is transversely to the longitudinal axis of the tube according to the present invention, with the tube shown installed as part of a novel drainage system.

Discussing the drawing now in detail it will be seen that we have illustrated a portion of a novel drainage system according to the present invention. The illustration will suffice for an explanation not only of the drainage system as such, but also of the novel pipe, because the details of the pipe will be evident from the drawing.

The pipe here is of a suitable synthetic plastic material and is designated with reference numeral 1. One synthetic plastic material that might be mentioned here is polyvinyl chloride, although others are also suitable. The pipe is corrugated, that is it is provided with a plurality of hollows 3 and ridges 4 and all of which are circumferential of the pipe 1 and which alternate with one another in axial direction of the same. Water inlet apertures 2 are provided in the circumferential wall of the pipe 2, being located in the hollows 3 so that water can enter into the interior of the pipe. Thus far, pipes of this type are known from the prior art for drainage purposes.

Figures 2, 3:
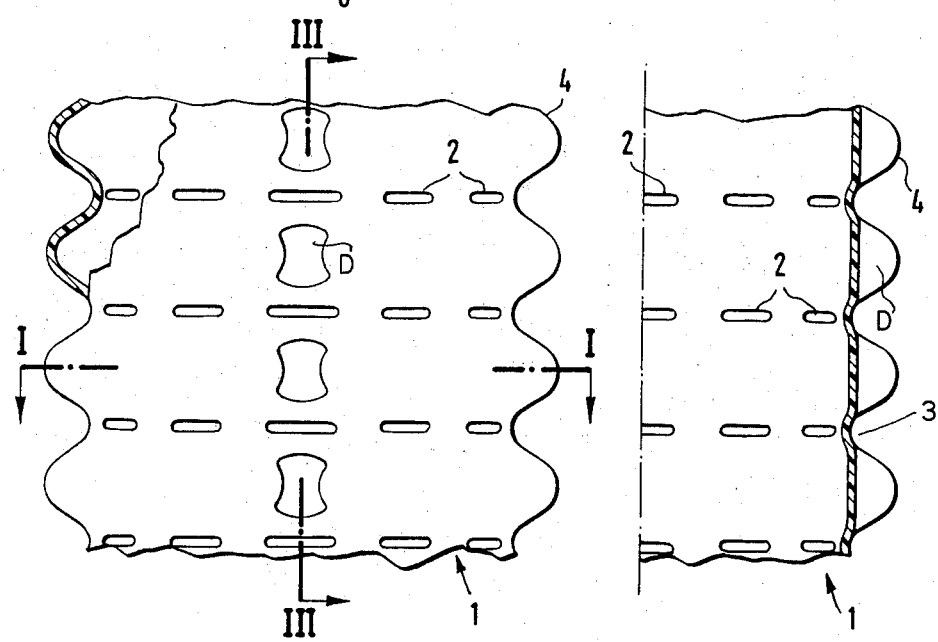
FIG. 2 is a fragmentary bottom-plan view of the tube in FIG. 1, with the other components of FIG. 1 having been omitted for the sake of clarity and with the tube having been shown in part broken away.
FIG. 3 is a section taken on line III—III of FIG. 2.

In contradistinction to the known corrugated pipes, however, the pipe 1 illustrated in FIGS. 1–3 is provided at the exterior side of some or all of its ridges 4 with depressions D which, as FIG. 1 shows particularly clearly, are undercut. In other words, the cross section of the depressions D diverges from a narrow dimension at the apex of the respective ridge 4 in radially inward direction to a wider dimension. Irrespective of whether only some of the ridges 4 are provided with the depressions D, or whether all of them are provided with such depressions, all of the depressions will be aligned in axial direction of the pipe 1. The inner wall bounding the respective depression D is advantageously planar for manufacturing reasons. The cross sectional configuration of the depressions D, in direction normal to the longitudinal axis of the pipe 1, may be approximately trapezoidal as shown, but could of course be otherwise chosen.

It will be appreciated that each depression D acts in effect as a gripper, having jaws by means of which it can engage the foil as will be discussed. Quite surprisingly it has been found that a corrugated pipe produced with the depressions D can be separated from the tool forming the depressions, without any difficulties if the undercut configuration of the individual depressions is not too exaggerated. The separation from the tools can be facilitated in particular in that the pipe is separated from the tool in still relatively hot condition, that is in a condition in which it is still readily deformable but is no longer deformable to the extent that it shape could be permanently altered. The amount of undercut in the individual depressions need not be particularly great in order to achieve the desired retentive capability, so that the separation from the tools can be effected without trouble.

Of course, the provision of depressions — whose depths may correspond approximately to the depth of the hollows 3 — in all of the ridges 4, instead of only in some of them, will facilitate the engagement with the foil and also is simpler from a manufacturing point of view.

Reference numeral 5 designates a synthetic plastic foil which is illustrated only in FIG. 1, having been omitted in FIGS. 2 and 3 for the sake of clarity of illustration. Such a foil is deposited on a surface where the entry of water is to be prevented. To connect the foil 5, whose thickness and width can be selected in accordance with the given requirements, with the pipe 1, the latter is placed onto one surface of the foil 5 or conversely the foil 5 is placed onto the pipe 1 so that it overlies the recesses D thereof. Now a connecting element, here illustrated in form of a rope, rod, wire or the like which may be of synthetic plastic material, is placed against the opposite side of the foil 5. Pressure exerted on the element 6 will now cause the same to snap into the respective recesses D, together with such portions of the foil as surround the element 6. The material of the element 6 need not be elastic, although this is a possibility, because the pipe 1 will yield sufficiently to permit the entry of the element 6 and the surrounding portions of the foil 5 into the respective recesses D, as long as the diameter of the element 6 (which advantageously is of circular cross section) is not too much greater than the minimum transverse dimension of the recesses D.

It is of course possible to have the element 6 permanently connected with foil 5, for instance by welding it thereto, by forming it of one piece therewith or in any other suitable manner. This, however, would not detract from the concept of the invention.

It will be appreciated that in a drainage system utilizing the novel pipe, such as is fragmentarily shown in FIG. 1, it will usually be the case that two or more such pipes 1 are used in conjunction with the foil 5. It will also be understood that the pipe 1, singly or in conjunction with the foil 5 might be used not for draining water away from a location but for supplying it to the location. It is conceivable, for instance, that water is to be supplied to a location where it is desirable that the water should not penetrate into the ground beneath the foil, but should remain available on top of the foil for entry into the ground which is located above the foil. This is of course also intended to be encompassed within the range of applicability of the invention.

It will be understood that each of the elements described above, or two or more together, may also find a useful application in other types of constructions differing from the types described above.

While the invention has been illustrated and described as embodied in a novel corrugated synthetic plastic pipe and drainage system utilizing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. As a novel article of manufacture, a pipe of synthetic plastic material for use in a liquid-conducting system, said pipe having a corrugated wall provided in axial direction with alternate circumferential ridges and hollows, said wall being provided in respective ones of said hollows with a plurality of apertures, at least some of said ridges having in the respective exterior sides thereof radially inwardly divergent depressions arranged spaced from each other and aligned in axial direction of said pipe, said depressions receiving with a snap action an elongated strand-shaped element which is to hold a foil in place adjacent said pipe.

2. An article of manufacture as defined in claim 1, wherein all of said ridges are each formed with a respective one of said depressions.

3. An article of manufacture as defined in claim 1, wherein the depth of said depressions corresponds substantially to the depth of said hollows.

4. An article of manufacture as defined in claim 1, wherein said synthetic plastic material is polyvinyl chloride.

5. In a drainage system, a combination comprising at least one pipe of synthetic plastic material having a corrugated wall provided in axial direction with alternate circumferential ridges and hollows, said wall being provided in respective ones of said hollows with a plurality of apertures, and at least some of said ridges each having a radially inwardly divergent depression formed in the exterior side thereof with all such depressions being aligned in axial direction of said pipe; a synthetic plastic foil beneath said pipe; and an elongated strand-shaped element provided on said foil extending along said pipe and being received with a snap action in said depressions.

6. A combination as defined in claim 5, said foil having one side facing toward and another side facing away from said pipe; and wherein said elongated element is located at said other side and is received in said depressions together with respective overlying portions of said foil.

7. A combination as defined in claim 5, wherein all of said ridges are each provided with one of said depressions, said elongated element being received with a snap action in all of said depressions.

8. A combination as defined in claim 5, wherein said depressions have a depth corresponding substantially to the depth of said hollows.

9. A combination as defined in claim 5, wherein said synthetic plastic material is polyvinyl chloride.

10. A combination as defined in claim 5, wherein the cross-sectional contour of said depressions, in direction transverse to the elongation of said pipe, is substantially trapezoidal.

11. In a liquid-conducting system, a combination comprising at least one pipe of synthetic plastic material having a corrugated wall provided in axial direction with alternate circumferential ridges and hollows, said wall being provided with a plurality of apertures, and at least some of said ridges each being formed with a radially inwardly divergent depression, with all such depressions being aligned in axial direction of said pipe; a synthetic plastic foil beneath said pipe; and an elongated strand-shaped element provided on said foil extending along said pipe and being received with a snap action in said depressions.

* * * * *

UNITED STATES PATENT OFFICE
CERTIFICATE OF CORRECTION

Patent No. 3 820 340　　　　　　Dated June 28, 1974

Inventor(s) Heinrich Jenner and Georg Schmidt

It is certified that error appears in the above-identified patent and that said Letters Patent are hereby corrected as shown below:

In the heading of the patent :

FRANISCHE ISOLIERROHR-UND METALLWAREN_WERK GEBRUEDER

KIRCHNER    is corrected to read

Fraenkische ISOLIERROHR-UND METALLWAREN-WERKE

GEBRUEDER KIRCHNER

Signed and sealed this 26th day of November 1974.

(SEAL)
Attest:

McCOY M. GIBSON JR.　　　　　　C. MARSHALL DANN
Attesting Officer　　　　　　　　Commissioner of Patents